(12) United States Patent
Keller et al.

(10) Patent No.: US 7,781,123 B2
(45) Date of Patent: Aug. 24, 2010

(54) METHOD AND APPARATUS FOR FORMING ELECTRODE INTERCONNECT CONTACTS FOR A SOLID-OXIDE FUEL CELL STACK

(75) Inventors: Joseph M. Keller, Grand Blanc, MI (US); Karl J. Haltiner, Jr., Fairport, NY (US); Subhasish Mukerjee, Rochester, NY (US); Diane M. England, Bloomfield, NY (US); Gary F. Reisdorf, Penfield, NY (US); Steven L. Cooper, Flint, MI (US); Willem Vilders, III, Holly, MI (US)

(73) Assignee: Delphi Technologies, Inc., Troy, MI (US)

( * ) Notice: Subject to any disclaimer, the term of this patent is extended or adjusted under 35 U.S.C. 154(b) by 1435 days.

(21) Appl. No.: 11/145,647

(22) Filed: Jun. 6, 2005

(65) Prior Publication Data

US 2006/0275649 A1 Dec. 7, 2006

(51) Int. Cl.
*H01M 8/12* (2006.01)
*H01M 8/02* (2006.01)
*H01M 4/86* (2006.01)
*C04B 35/64* (2006.01)

(52) U.S. Cl. ............ 429/533; 429/496; 429/532; 429/44; 429/45; 264/618

(58) Field of Classification Search .................... None
See application file for complete search history.

(56) References Cited

U.S. PATENT DOCUMENTS 5,064,734 A * 11/1991 Nazmy .................. 429/33

5,702,837 A 12/1997 Xue (Continued)

FOREIGN PATENT DOCUMENTS

DE 4436456 * 4/1996

(Continued)

OTHER PUBLICATIONS

EPO machine translation of DE19835253, published Jan. 13, 2000, retrieved Aug. 26, 2008.*

(Continued)

*Primary Examiner*—Dah-Wei D Yuan
*Assistant Examiner*—Katherine Turner
(74) *Attorney, Agent, or Firm*—Thomas N. Twomey

(57) ABSTRACT

An electrical interconnect for a solid-oxide fuel cell stack assembly, including a novel sintering paste and an improved manufacturing process for an anode and cathode electrical contacts is disclosed. On the anode side, the paste contains a metallic oxide such as NiO, and an amount of sacrificial pore-forming particles, such as carbon particles or polymer spheres, which are vaporized during sintering of the paste, resulting in a very porous connection having good electrical conductivity and good adhesion. A preferred level of pore-former in the paste is about 40 volume percent. On the cathode side, the paste contains a noble metal such as for example, gold, platinum, palladium or rhodium, and an amount of the sacrificial pore-forming particles. The paste may be applied to the surfaces in a grid pattern or, because the resulting contact is porous after sintering, it may be applied as a continuous layer.

21 Claims, 1 Drawing Sheet

U.S. PATENT DOCUMENTS

| | | | |
|---|---|---|---|
| 6,048,636 A * | 4/2000 | Naoumidis et al. | 429/44 |
| 2002/0177025 A1* | 11/2002 | Kushibiki et al. | 429/30 |
| 2004/0101742 A1* | 5/2004 | Simpkins et al. | 429/44 |
| 2004/0106031 A1 | 6/2004 | Sherman et al. | |
| 2006/0153974 A1 | 7/2006 | Matsuzaki et al. | |

FOREIGN PATENT DOCUMENTS

| | | |
|---|---|---|
| DE | 198 35 253 | 1/2000 |
| EP | 1 624 521 | 2/2006 |
| GB | 2 390 739 | 1/2004 |
| WO | 02/089242 | 11/2002 |
| WO | 2004/088783 | 10/2004 |

OTHER PUBLICATIONS

Official translation of DE4436456, publised Apr. 18, 1996, translated by Schreiber Translations, Inc. Aug. 2009.*

Corresponding EP Search Report dated Oct. 4, 2006.

* cited by examiner

METHOD AND APPARATUS FOR FORMING ELECTRODE INTERCONNECT CONTACTS FOR A SOLID-OXIDE FUEL CELL STACK

STATEMENT REGARDING FEDERALLY SPONSORED RESEARCH OR DEVELOPMENT

This invention was made with United States Government support under Government Contract/Purchase Order No. DE-FC26-02NT41246 awarded by DOE. The Government has certain rights in this invention.

TECHNICAL FIELD

The present invention relates to solid-oxide fuel cells; more particularly, to electrical interconnects for anodes and cathodes in a solid-oxide fuel cell stack; and most particularly, to method and apparatus for forming electrode interconnect contacts having improved electrical performance, improved reliability, and greater working lifetime.

BACKGROUND OF THE INVENTION

Fuel cells for combining hydrogen and oxygen to produce electricity are well known. A known class of fuel cells includes a solid-oxide electrolyte layer through which oxygen anions migrate; such fuel cells are referred to in the art as "solid-oxide" fuel cells (SOFCs).

In some applications, for example, as an auxiliary power unit (APU) for a transportation application or a stationary power unit (SPU) for a stationary application, an SOFC is preferably fueled by "reformate" gas, which is the effluent from a catalytic liquid or gaseous hydrocarbon oxidizing reformer, also referred to herein as "fuel gas".

Reformate typically includes amounts of carbon monoxide (CO) as fuel in addition to molecular hydrogen. The reforming operation and the fuel cell operation may be considered as first and second oxidative steps of the hydrocarbon fuel, resulting ultimately in water and carbon dioxide. Both reactions are preferably carried out at relatively high temperatures, for example, in the range of 700° C. or higher.

A complete fuel cell stack assembly includes a plurality of fuel cells, for example, 60 cells in the form of sub-assemblies which are electrically connected in series. Typically, connection of adjacent fuel cell sub-assemblies comprises a separator plate having a conductive interconnect element on each side, the interconnects being disposed in the fuel gas and air flow spaces and in electrical contact with the anodes and cathodes of the fuel cells.

Maintaining good electrical contact between a separator plate and fuel cell electrodes is essential in operating an SOFC stack with high efficiency. In the prior art, a conductive metal mesh is attached on a first side to the separator plate via a plurality of spot welds and the other side of the mesh makes contact with the fuel cell electrode via mechanical contact. To further ensure electron flow into and out of the fuel cell, a conductive material is applied in a grid pattern to the anode surface of the electrode and sintered to ensure bonding and adequate porosity, and the interconnect mesh is bonded to the conductive material. The bond joints are made by sintering a paste containing nickel oxide (NiO) particles onto the anode surface. In the prior art, the grid pattern also is formed by a paste. A serious drawback is that in the event the grid is fired at too high a temperature or not formulated properly, the grid pattern could become densified and non-porous, preventing the anode reactive gas from sufficiently penetrating the porous microstructure, starving the reaction zone of fuel supply. This would lower the efficiency of the electrochemical reaction at the triple phase boundary and reduce cell performance.

The SOFC anode layer of the electrode is a cermet comprising nickel oxide and yttria-stabilized zirconia (YSZ). A contact paste used on the anode surface has a few basic requirements. The paste must provide and maintain electrical conductivity between the fuel cell anode and the interconnect in the anode operating environment (temperature, reducing atmosphere, coefficient of thermal expansion, and the like). It is vital that good adhesion of the paste to the interconnect and to the fuel cell anode is obtained so that this electrical path is maintained throughout the life of the fuel cell stack, after many thermal/electrical cycles. Also, it is highly desirable that the contact paste, after sintering, be sufficiently porous to allow the flow of fuel gas into, and by-products out of, the anode. In the prior art, the contact paste spots can become densified and non-porous and thus represent areas where the anode reaction is prevented from taking place or at the least reduces the diffusion of the reactant gas through the microstructure, limiting the availability of the reactive species at the triple phase boundary. Reduction of the permeability of fuel gas through the electrode microstructure is believed to be a major contributor to reduced fuel utilization.

A prior art method for forming the electrical connections of the interconnect to the separator plate and to the anode surface of an SOFC comprises the steps of:

a) fabricating a sintered fuel cell bi-layer comprising the electrolyte layer on the anode support;

b) screen printing a paste containing NiO in a screen (grid) pattern onto the anode surface;

c) sintering the screened pattern at 1200° C.;

d) printing the cathode material onto the electrolyte layer and sintering the cathode;

e) spot welding a first side of an interconnect on the anode side to a separator plate at a plurality of locations;

f) applying anode contact paste to the anode grid pattern at a plurality of locations;

g) positioning the separator plate such that the second side of the interconnect is in contact with the anode contact paste;

h) sintering the anode contact paste in air to 825° C., then reducing the stack operating temperature to 750° C.; and i) exposing the anode side of the cell to a reducing gas to reduce the NiO to Ni in the anode itself, the anode grid, and the anode contact paste.

Anode contacts formed in accordance with the prior art method and materials are vulnerable to at least two serious and known shortcomings.

First, adhesion of the interconnect to the anode surface is typically rather poor and results in significant loss of power due to interfacial contact failures. It has been found that a large part of the adhesion problem is due to low bond strength between the sintered grid and the anode surface. Further, the paste does not bond especially well with the sintered grid.

Second, the NiO in the grid and in the contact paste sinters as NiO but is then reduced by the fuel gas to metallic Ni, and becomes very dense and non-porous. This is detrimental as the availability of the anode surface to reactant gas is reduced. Closing off the open pore volume inherent in the pre-sintered paste to reactant gas flow may cause a reduction in cell operating voltage due to concentration polarization as well as substantial reduction in fuel utilization. This also can interfere with reactant by-products such as water and carbon dioxide escaping from the cell, leading to critical cell failure.

A similar situation can occur on the cathode side of the fuel cell. In this case, due to the oxidizing environment, a noble metal (or alloy) is preferably used to form a contact grid on the cathode. A cathode contact paste, containing noble metal (or alloy) particles, can then be used to make a bonded electrical contact joint from the cathode to the interconnect on the cathode side of the cell. The cathode contact formed in accordance with the prior art method and materials is vulnerable to the paste particles sintering to form non-porous areas covering the cathode. This phenomenon can result in reduced oxygen transport to the electrolyte which leads to diminished cell performance.

What is needed in the art is an improved anode and cathode electrical connection that utilizes an improved interconnect to electrode contact paste.

What is further needed in an improved method of cell anode and cathode contact surface fabrication.

It is a principal object of the present invention to increase the reliability and longevity of an SOFC stack.

SUMMARY OF THE INVENTION

Briefly described, an improved electrical interconnect system for a solid-oxide fuel cell stack assembly comprises a novel anode and cathode contact paste and an improved manufacturing process.

The paste used on the anode side, in accordance with the invention, is an NiO paste similar to the prior art paste but containing an amount of sacrificial pore-forming particles which are vaporized (burned out, sublimed) and fugitive during sintering of the paste, resulting in a very porous connection that also maintains good electrical conductivity and good adhesion. Exemplary suitable pore-formers are carbon particles and organic polymer spheres, while others such as rice starch, alkaline carbonate, could be utilized. A currently-preferred level of pore-former in the paste is about 40 volume percent.

The quality of the anode contact is improved by altering the application and sintering process in one of three alternative ways.

First, sintering the anode grid thick film paste at up to 1400° C. rather than 1200° C. as in the prior art significantly improves adhesion of the grid to the anode surface.

Second, the grid may be silk-screened to the unfired anode surface of the anode/electrolyte bi-layer laminate prior to sintering thereof and the sub-assembly then sintered in a single firing.

Third, a continuous NiO layer, rather than a layer formed in a grid pattern, including pore-forming particles, may be applied to the non-fired anode surface by tape casting, screen printing, or stenciling and then sintered as before, resulting in a continuous, porous conductive layer over the entire anode surface.

On the cathode side, while the contact paste formulation is preferably a noble metal (or alloy) paste similar to the prior art paste, it also contains an amount of sacrificial pore-forming particles which are vaporized (burned out, sublimed) and fugitive during sintering of the paste, resulting in a very porous connection that also maintains good electrical conductivity and good adhesion. Exemplary suitable pore-formers are carbon particles and organic polymer spheres, while others such as rice starch, alkaline carbonate, could be utilized. A currently-preferred level of pore-former in the paste is about 40 volume percent.

As in the case of the anode paste, the cathode contact paste may be applied in a grid pattern, or in a continuous or near continuous layer.

BRIEF DESCRIPTION OF THE DRAWINGS

The present invention will now be described, by way of example, with reference to the accompanying drawing, in which.

DESCRIPTION OF THE PREFERRED EMBODIMENTS

Figure 1:
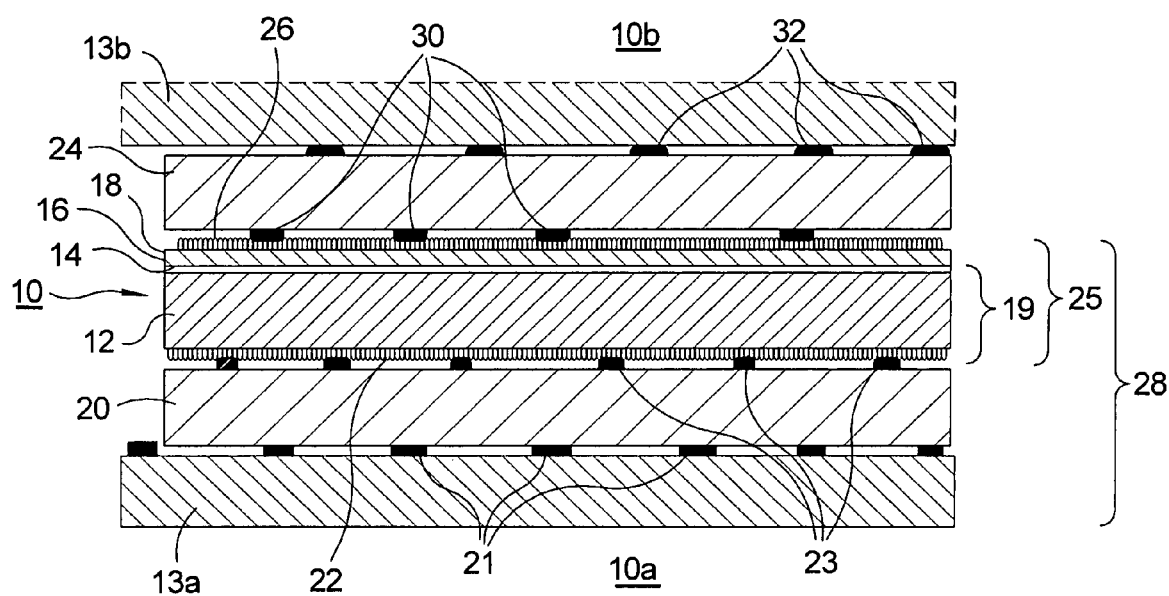
FIG. 1 is a schematic elevational cross-section view of a fuel cell repeating unit in accordance with the invention.

Referring to FIG. 1, a solid-oxide fuel cell 10a is shown accompanied by first and second separator plates 13a,13b electrically connecting fuel cell 10a to adjacent fuel cell, 10b in a stack. Fuel cell 10a comprises a structural anode element 12, an electrolyte element 14 adjacent the anode, an optional cathode/electrolyte interlayer 16, and a cathode element 18. Optional interlayer 16 preferably is formed of doped ceria and serves to improve the cathode to electrolyte interaction.

An anode interconnect 20 provides electrical continuity between first separator plate 13a and anode element 12 via an anode conductive element 22 bonded on the surface of anode element 12. Anode interconnect 20 preferably is formed of stainless steel mesh or other metal material inert in the reducing atmosphere of fuel gas during operation of a fuel cell. A cathode interconnect 24 provides electrical continuity between second separator plate 13b and cathode element 18 via a cathode conductive element 26 bonded on the surface of cathode element 18. Cathode interconnect 24 preferably is formed of a metal mesh.

Anode conductive element 22 is bonded to the surface of anode element 12 to enhance electrical continuity with interconnect 20. Element 22 may be formed in a grid pattern, as by screen printing of an appropriate sinterable paste including a metal oxide in known fashion, or preferably is formed by application of a continuous layer of an appropriate sinterable paste, or tape cast film as described below. In a presently-preferred embodiment, the anode, electrolyte, and anode conductive element are laid up together and sintered to a temperature of between about 1200° C. and about 1600° C., preferably about 1400° C., which process provides an excellent and durable bond between the anode conductive element and the anode itself.

Next, cathode conductive element 26 is bonded to the surface of cathode element 18 to enhance electrical continuity with cathode interconnect 24. Element 26 may be formed as a grid or near-continuous layer, for example, by screen printing of an appropriate sinterable paste including a noble metal, such as for example, gold, platinum, palladium and rhodium, or alloys thereof, as described below. In a presently-preferred embodiment, the fired anode, eletrolyte, anode conductive element, and unfired cathode and cathode conductive element are laid up together and sintered to a temperature of between about 900° C. and about 1300° C., preferably about 1100° C., which process provides an excellent and durable bond between the cathode conductive element and the cathode itself.

Next, anode interconnect 20 may be bonded to separator plate 13a as by welding at a plurality of locations in a first predetermined pattern. Alternatively, in a preferred embodiment, bonding may comprise a sinterable paste including a metal oxide, preferably nickel oxide, capable of being reduced to pure metal in a reducing environment. A pattern 21 of an appropriate metallic contact paste, as described below, preferably containing NiO, is placed on the surface of separator plate 13a, and a similar pattern 23 of metallic contact paste is placed on anode conductive element 22, and interconnect 20 is inserted therebetween such that when the assembly is heated to about 850° C. in a reducing atmosphere the spots of paste are reduced to metal and bond the anode interconnect 20 to separator plates 13a and to the anode conductive element 22.

The combination of first separator plate 13a, anode interconnect 20, anode conductive element 22, anode element 12, electrolyte element 14, optional interlayer 16, cathode element 18, and cathode conductive element 26 defines a repeating module 28 in a fuel cell stack, which module may take the form of a closed cassette (not shown).

In forming a stack of a plurality of modules, a pattern 30 of a cathode contact paste, preferably containing a noble metal or alloy, is placed on the surface of the cathode conductive element 26 of a plurality of fuel cell modules, and a similar pattern 32 of cathode contact paste is placed on the separator plates 13b of adjacent modules such that when the stack is heated to about 850° C. the metal powder in the paste sinters to bond the cathode interconnects 24 to the separators plates 13b and to the cathode conductive elements 26. During subsequent operation of the stack at about 750° C., the bonding remains firm.

An important aspect of the present invention is the nature and formulation of the pastes used to form the anode conductive element 22, the cathode conductive element 26, and the anode and cathode interconnect bonding paste patterns 21,23, 30 and 32. As noted above, in prior art fuel cell assemblies, the prior art pastes densify upon heating or sintering and become impermeable to fuel gas and reactant by-products on the anode side, or oxygen on the cathode side, thus obstructing significant portions of the anode and cathode surfaces, resulting in a proportional decrease in electric output. What is needed in the art is a paste formulation that will provide good adhesion and good electrical conductivity while also providing high porosity to gas, thus permitting "covered" areas of the anode and cathode to participate in the fuel cell reaction.

An improved contact paste used on the anode side has been developed that leads to higher porosity in the sintered and reduced state in which a cell operates. The improved metallic paste increases permeability of the reactant gases into the anode portion of the cell and of the reaction by-products out of the anode. Similarly, an improved contact paste used on the cathode side has been developed that leads to higher porosity in the sintered state. The improved metallic paste increases permeability of oxygen into the cathode portion of the cell. A particulate "pore-former" such as carbon particles, starch particles, carbonate particles or polymer spheres is incorporated into these cathode and anode contact pastes in a range preferably from about 30% to about 45% expressed as volume percent, and most preferably about 40 volume percent. Other particulate materials may also be suitable within the scope of the invention. A common characteristic of suitable materials is that they will be disappear and be removed during a sintering process, such as by burning or vaporization in air, of the fuel cell assembly at its various stages, leaving behind a porous structure where particles bond together by diffusion of mass (sintering) and voids remain between the bonded particles.

Particulate materials are similarly incorporated in the metallic paste for forming the anode conductive element 22 and the cathode conductive element 26. Since the post-sintering porosity of these elements is sufficiently higher, these conductive elements may be formed as continuous layers rather than as grids. Of course, grid formations for conductive element 22 and/or 26 employing the particulated pastes of the invention are fully within the scope of the invention.

A method for forming anode conductive element 22 includes the following steps:

a) providing an anode element 12;

b) depositing an electrolyte element 14 adjacent a first side of anode element 12;

c) depositing a paste composition containing a metal oxide such as NiO and pore-forming particles in a range between 30 volume percent and 45 volume percent on a second side of anode element 12 in a predetermined shape of conductive element 22; and d) sintering in air anode element 12, electrolyte element 14, and the metal oxide composition together at a temperature between about 1200° C. and about 1600° C. to form a first pre-assembly 19 wherein electrolyte element 14 is bonded to anode element 12 and wherein a porous metal oxide anode conductive element 22 is formed on anode element 12, permitting permeation of reactive fuel gas into the anode and reaction by-products out of the anode.

A method for forming a cathode conductive element 26 includes the following steps:

a) depositing an optional cathode/electrolyte interlayer 16 adjacent the free surface of electrolyte element 14;

b) depositing a cathode element 18 adjacent either optional interlayer 16 or the free surface of electrolyte element 14;

c) depositing a paste composition containing a noble metal or alloy and pore-forming particles in a range between 30 volume percent and 45 volume percent on a second side of cathode element 18 in a predetermined shape of conductive element 26; and d) sintering in air first pre-assembly 19, cathode element 18, cathode conductive element 26 and, optionally, interlayer 16 together at a temperature between about 1000° C. and about 1200° C. to form a second pre-assembly 25 wherein cathode element 18 (and optional interlayer 16) is bonded to first pre-assembly 19 and wherein a porous metallic cathode conductive element 26 is formed on cathode element 18, permitting permeation of oxygen into the cathode.

A method for joining anode interconnect element 20 to second pre-assembly 25 includes the following steps:

a) applying a contact paste containing a metal oxide such as NiO and pore-forming particles in a range between about 30 volume percent and about 45 volume percent to the free surface of separator plate 13a in a predetermined pattern;

b) applying a contact paste containing a metal oxide such as NiO and pore-forming particles in a range between about 30 volume percent and about 45 volume percent to the anode conductive element 22 of second pre-assembly 25 in a predetermined pattern;

c) inserting anode interconnect 20 between adjacent separator plate 13a and anode conductive element 22 to form a module 28; and d) heating the module to a temperature between about 600° C. and about 900° C. to burn off the pore-forming particles.

A method for joining cathode interconnect element 24 to module 28 to form a fuel cell stack includes the following steps:

a) applying a contact paste containing a noble metal or alloy and pore-forming particles in a range between about 30 volume percent and about 45 volume percent to the free surface of separator plate 13b of adjacent module 28 in a predetermined pattern;

b) applying a contact paste containing a noble metal or alloy and pore-forming particles in a range between about 30 volume percent and about 45 volume percent to cathode conductive element 26 of module 28 in a predetermined pattern;

c) inserting cathode interconnect 24 between adjacent separator plate 13a and cathode conductive element 26 to form a fuel cell stack 34; and d) heating the fuel cell stack to a temperature between about 600° C. and about 900° C. to burn off the pore-forming particles.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In a solid-oxide fuel cell assembly for use in reacting fuel gas to generate electricity in a solid-oxide fuel cell stack, which assembly includes a cathode, an electrolyte layer, a structural anode element, an anode conductive element attached to a surface of the structural anode element, a separator plate off-spaced from the anode conductive element, and a metallic anode interconnect disposed between the separator plate and the anode conductive element, the improvement comprising said anode conductive element being porous and permeable to said fuel gas, and said anode conductive element being configured as a continuous layer, wherein said metallic anode interconnect is attached by a sintered material to said separator plate and to said anode conductive element, said sintered material being porous and permeable to said fuel gas, wherein said sintered material is a separate component relative to said anode conductive element.

2. A fuel cell assembly in accordance with claim 1 wherein said sintered material is formed from a paste containing a metal oxide.

3. A fuel cell assembly in accordance with claim 1 wherein said sintered material is formed from a paste containing a metal oxide and pore-forming particles.

4. A fuel cell assembly in accordance with claim 3 wherein said pore-forming particles are present in said paste at between about 10 and about 60 volume percent.

5. A fuel cell assembly in accordance with claim 3 wherein said pore-forming particles are present in said paste at 40 volume percent.

6. A fuel cell assembly in accordance with claim 3 wherein said pore-forming particles are removed by carrying out a sintering process in air.

7. A fuel cell assembly in accordance with claim 6 wherein said sintering process is carried out at a temperature of about 850° C.

8. A fuel cell assembly in accordance with claim 7 wherein said sintering process is followed by exposure to a reducing environment.

9. A fuel cell assembly in accordance with claim 8 wherein said pore-forming particles are selected from the group consisting of carbon particles, starch particles, carbonate particles and polymer spheres.

10. A fuel cell assembly in accordance with claim 1 wherein said sintered material is formed in a predetermined pattern.

11. A fuel cell assembly in accordance with claim 10 wherein said predetermined pattern is selected from the group consisting of a grid and a continuous layer.

12. In a solid-oxide fuel cell assembly for use in reacting fuel gas to generate electricity in a solid-oxide fuel cell stack, which assembly includes a cathode, an electrolyte layer, an anode, an cathode conductive element attached to a surface of the cathode, a separator plate off-spaced from the cathode conductive element, and a cathode interconnect disposed between the separator plate and the cathode conductive element, the improvement comprising said cathode conductive element being porous and permeable to oxygen transportable to said electrolyte layer, and said cathode conductive element being configured as a continuous layer, wherein said cathode interconnect is attached by a sintered material to said separator plate and to said cathode conductive element, said sintered material being porous and permeable to oxygen transportable to said electrolyte layer, wherein said sintered material is a separate component relative to said cathode conductive element.

13. A fuel cell assembly in accordance with claim 12 wherein said sintered material is formed from a paste containing a noble metal.

14. A fuel cell assembly in accordance with claim 12 wherein said sintered material is formed from a paste containing a noble metal and pore-forming particles.

15. A fuel cell assembly in accordance with claim 14 wherein said pore-forming particles are present in said paste at between about 10 and about 60 volume percent.

16. A fuel cell assembly in accordance with claim 14 wherein said pore-forming particles are present in said paste at 40 volume percent.

17. A fuel cell assembly in accordance with claim 14 wherein said pore-forming particles are removed by carrying out a sintering process in air.

18. A fuel cell assembly in accordance with claim 17 wherein said sintering process is carried out at a temperature of about 850° C.

19. A fuel cell assembly in accordance with claim 14 wherein said pore-forming particles are selected from the group consisting of carbon particles, starch particles, carbonate particles and polymer spheres.

20. A fuel cell assembly in accordance with claim 12 wherein said sintered material is formed in a predetermined pattern.

21. A fuel cell assembly in accordance with claim 20 wherein said predetermined pattern is selected from the group consisting of a grid and a continuous layer.

* * * * *